United States Patent Office 2,897,221
Patented July 28, 1959

2,897,221

SYMMETRICAL DIPHENYLDIMETHYLDIVINYL-DISILOXANE AND ITS USES

Donald R. Weyenberg, University Park, Pa., assignor to Dow Corning Corporation, Midland, Mich., a corporation of Michigan No Drawing. Application January 5, 1956
Serial No. 557,442

1 Claim. (Cl. 260—448.2)

This invention relates to a divinyldisiloxane and its use as a diluent and coreactant for casting resins.

Commercially useable organosilicon casting resins are described and claimed in U.S. Patent 2,714,099. These materials comprise certain copolymers of phenylvinylsiloxane and phenylmethylsiloxane which may or may not contain end-blocking groups. When these materials are cured with organic peroxides or other catalysts, they give tough, flexible, commercially useful resins. However, the best strengths are obtained from copolymers having a viscosity in excess of 5,000 cs., preferably 25,000 cs. or higher. Whereas such materials can be cast in certain applications, there are other applications where it is undesirable or impossible to use a material having such a high viscosity. If phenylvinylsiloxane-phenylmethylsiloxane copolymers below 5,000 cs. (i.e. from 100 to 3,000 cs.) are employed, the cured resins have lower physical strengths. Thus even though the low viscosity copolymers can be properly cast or used to impregnate articles, the strength of the cured resin is less than that desired for many applications.

Consequently the problem posed is how to obtain a low viscosity material (that is one below 5,000 cs.) which can be utilized both as casting resins and as impregnating resins and which still retains the desirable physical properties of the high viscosity resins of the aforesaid patent. This retention of strength must also be accomplished without deterioration of the good thermal stability of phenylmethylsiloxane-phenylvinylsiloxane resins. Applicant has solved the problem with the compositions of this invention.

It is the object of this invention to produce a novel organosiloxane which is useful as a diluent and coreactant for vinylsiloxane resins. Another object is to provide a novel composition of matter of sufficiently low viscosity that it will combine the maximum castability and impregnation properties with the maximum physical strength and thermal stability in the cured resin. Further objects and advantages will be apparent from the following description.

This invention relates to the siloxane symmetrical diphenyldimethyldivinyldisiloxane.

The novel disiloxane of this invention may be prepared by reacting methylvinyldichlorosilane with a phenyl Grignard to produce methylphenylvinylchlorosilane and thereafter hydrolyzing the chlorosilane and condensing the hydrolyzate by heating with potassium acetate in refluxing toluene.

The sym-dimethyldiphenyldivinyldisiloxane was prepared as shown above. This compound has the following properties: B.R. 155 to 160° C. at 5 to 6 mm., $d_4^{25}$ 0.9958, $n_D^{25}$ 1.5310 and viscosity at 25° C. 4.7 cs.

That which is claimed is:

Symmetrical dimethyldiphenyldivinyldisiloxane.

References Cited in the file of this patent

UNITED STATES PATENTS

| | | |
|---|---|---|
| 2,714,099 | Weyenberg | July 26, 1955 |
| 2,716,638 | Cohen et al. | Aug. 30, 1955 |
| 2,756,246 | Burkhard | July 24, 1956 |